United States Patent [19]

Boden et al.

[11] 4,313,909

[45] Feb. 2, 1982

[54] METHOD AND AN APPARATUS FOR PRODUCING A REACTION MIXTURE FOR FORMING SOLID OR CELLULAR SUBSTANCES FROM FLOWABLE REACTANTS AND OPTIONALLY FILLERS

[75] Inventors: Heinrich Boden; Heinz Müller, both of Leverkusen; Bernd Sowade, Berg.-Gladbach, all of Fed. Rep. of Germany

[73] Assignee: Bayer Aktiengesellschaft, Leverkusen, Fed. Rep. of Germany

[21] Appl. No.: 130,293

[22] Filed: Mar. 14, 1980

[30] Foreign Application Priority Data

Mar. 23, 1979 [DE] Fed. Rep. of Germany ....... 2911547

[51] Int. Cl.³ .......................... B28B 1/24; B29F 1/14; B29H 7/20
[52] U.S. Cl. .................................. 422/133; 264/328.2; 366/175; 366/302; 366/305; 422/135; 425/543; 425/817 R; 156/125
[58] Field of Search ........................ 422/131, 133, 135; 264/328.2; 425/543, 817; 366/161, 175, 180, 302, 305; 156/125, 394

[56] References Cited

U.S. PATENT DOCUMENTS

| | | | |
|---|---|---|---|
| 2,497,226 | 2/1950 | McNeill | 156/125 |
| 2,995,346 | 8/1961 | Samples | 422/135 |
| 3,263,928 | 8/1966 | Gusmer | 239/123 |
| 3,393,052 | 7/1968 | Axelsson | 23/252 |
| 3,607,124 | 9/1971 | Zippel | 23/285 |
| 3,924,989 | 12/1975 | Althausen et al. | 425/130 |
| 4,099,919 | 7/1978 | Leidal | 422/133 |
| 4,126,399 | 11/1978 | Schneider et al. | 366/161 X |
| 4,175,873 | 11/1979 | Iwako et al. | 366/305 |

Primary Examiner—Michael S. Marcus
Attorney, Agent, or Firm—Gene Harsh; Joseph C. Gil

[57] ABSTRACT

The instant invention is directed to a method of producing a reaction mixture for forming solid or cellular materials from flowable reactants and, optionally, fillers, comprising premixing the components and, optionally, fillers in a first mixing zone and after-mixing in a second mixing zone, the improvement wherein said after-mixing is carried out in a slit-like annular zone which extends radially from the center, the surface boundaries of said annular zone are not parallel and one of said surface boundaries is rotated while the opposite facing surface boundary remains stationary. The instant invention is also directed to an apparatus for producing a reaction mixture for forming solid or cellular materials from flowable reactants and, optionally, fillers, comprising:
(a) storage containers for reactants, from which
(b) feed pipes lead via
(c) metering pumps to a
(d) premixing chamber which is arranged in a
(e) housing, and on whose outlet opening an
(f) after-mixing chamber is connected, the improvement wherein
(g) said after-mixing chamber comprises a slit which is formed by
(h) two baffle plates, one of which is provided with a
(i) rotary drive.

7 Claims, 17 Drawing Figures

METHOD AND AN APPARATUS FOR PRODUCING A REACTION MIXTURE FOR FORMING SOLID OR CELLULAR SUBSTANCES FROM FLOWABLE REACTANTS AND OPTIONALLY FILLERS

BACKGROUND OF THE INVENTION

The invention is based on a method and an apparatus for producing a reaction mixture for forming solid and cellular substances from flowable reaction components and, optionally, fillers wherein the components and, optionally, fillers are premixed in a first mixing zone and subsequently mixed in a second mixing zone.

The production of such reaction mixtures immediately precedes the manufacture of molded articles in a mold and the continuous production of foam blocks or sandwich webs. The products formed are composed, for example, of polyurethanes (formed from a polyol and an isocyante), unsaturated polyester resins, epoxide resins, polyisocyanurate resins, or ε-caprolactam.

Mixing devices such as stirring mixers and injection mixers for the production of these reaction mixtures are known (U.S. Pat. No. 3,607,124).

Stirring mixers are used widely for mixing reaction components of low reactivity, with high viscosity differences and metering ratios. The stirring mixers known at present are characterized by a stationary sleeve which forms the outer contour of the mixing chamber and a stirrer which is arranged rotatably inside this sleeve (U.S. Pat. No. 3,607,124; U.S. Pat. No. 3,393,052). The seal between the stirrer shaft and the sleeve must be provided with a pressure-sensitive seal. When the stirrer is designed as a mixing screw having a pumping action from the components inlet to the mixing chamber outlet, this seal may, in some instances, be dispensed with. Due to the air gap which is inevitably present, however, undesirable air is sucked into the reaction mixture if the rate at which the components are metered is too low. Reaction mixture enters the air gap and solidifies, which leads to interruptions, if the metering rate is too high. These devices are suitable only for relatively low metering rates. In the production of substantially pore-free molded articles employing intermittent operation for filling molds, there are always problems if the mixing chamber has to be emptied and cleaned between two mold filling processes (i.e. between two mixing processes) due to the high reactivity of the reaction mixture present in the mixing chamber. As mixing begins again, the reactants enter the air-filled mixing chamber and small air bubbles are inevitably stirred into the reaction mixture, particularly when using spiked stirrers.

Another important feature of all stirring mixers is the reduction in the cross-section of the mixing chamber toward the outlet zone in which the reaction mixture leaves the mixing chamber through a hole (which is preferably round) or through a tube. It is also common to all stirring mixers that the intensity of mixing can be influenced during a mixing process only by changing the speed of the stirrer or the rate of metering because the geometry of the mixing chamber cannot be changed during the mixing process in most cases.

Self-cleaning injection mixers which have forced control do not usually have a stirrer and do not, therefore, have any sealing or cleaning problems (U.S. Pat. No. 3,263,928). They are suitable for processing highly active multi-component reaction systems even at high mixing chamber pressures and at delivery rates of up to about 600 l/min. Even when these mixers are provided with static aftermixers, it has been found that, with large viscosity differences in the reactants, with extreme metering ratios, with systems having high filler contents and with slight affinity of the reactants to each other, an adequate mixing effect is not guaranteed at the beginning or end of the mixing phase (U.S. Pat. No. 3,924,989).

The object of the instant invention is to provide a method and an apparatus wherein reactants having large viscosity differences and/or extreme metering ratios and/or with a high filler content and/or slight affinity of the reactants can be mixed perfectly throughout the entire mixing process. The apparatus is free from seals which are susceptible to failure and is operable when the mixing chamber is subjected to relatively high pressures.

DESCRIPTION OF THE INVENTION

The above objects are achieved in the present invention by carrying out the after-mixing in a slit-like annular zone extending radially from a center, wherein the surfaces or boundaries of the zone are not parallel. One of the surfaces is rotated while the other remains stationary. This allows the premixed reaction mixture to be perfectly homogenized by the after-mixing in the annular zone under varying conditions. Particularly good transverse mixing is achieved because of the relative rotary motion. Sudden irregularities caused by long residence times are diminished.

The premixing is preferably carried out in the center. This has the particular advantage that the premixed reaction mixture is immediately subjected to after-mixing without additional residence time.

According to another embodiment of the process according to the invention, the thickness of the slit-like annular zone or gap between the surfaces or boundaries can be changed during the mixing process.

This has the advantage that the volume of the after-mixing chamber can be kept, for example, extremely small at the beginning of the mixing process. A back pressure is thus produced. Subsequently, the width of the slit can be increased so that the flow is calmed in spite of the continued mixing effect owing to the resulting increase in the flow front.

The reaction mixture inside the slit-like annular zone is preferably accelerated centrifugally so that the homogeneity of the mixture is further improved.

The apparatus according to the invention for carrying out the method comprises:

(a) storage containers for reactants, from which
(b) feed pipes lead via
(c) metering pumps to a
(d) premixing chamber which is arranged in a (e) housing and to whose outlet opening is connected an (f) after-mixing chamber.

The novelty lies in the fact that (g) the after-mixing chamber consists of a slit which is bounded by (h) two surfaces or so-called baffle plates, one of which is provided with a (i) rotary drive.

This particular embodiment has the advantage that seals are not necessary. This is possible because the axis of the rotating baffle plate is not the same as the rigid baffle plate. The two surfaces or baffle plates are thus not parallel.

The premixing chamber is preferably arranged in the center region or axis of the rigid baffle plate. A direct transition from the premixing chamber into the after-mixing chamber, i.e. into the slit, is thus achieved. The premixing chamber can obviously lie further upstream of the after-mixing chamber. This would, however, necessitate additional connecting channels. Difficulties would arise in this case, however, due to the problem of cleaning the premixing chamber and the connecting channels. Cleaning in the present invention, in contrast, may be accomplished in the premixing chambers, using a pushing piston.

At least one of the baffle plates axis may preferably be moved. This ability to change the position of the axis not only allows the volume of the after-mixing chamber to be adjusted beforehand to an optimum value for the respective reaction mixture but also allows the width of the slit to be varied during the mixing process. For example, the slit is initially kept at zero or approximately zero, is then increased and is reduced again toward the end of the mixing process.

At least one of the baffle plates is preferably provided with contours over its surface facing the slit. These contours can be of many types and serve certain purposes such as, for example, blocking or accelerating the reaction mixture, forming streams of flow which intersect each other. In so doing, the streams are mixed as in a static mixing device without too much shearing. In this way, it is, for example, possible to divide the after-mixing chamber into an expanding zone, a blocking zone, a conveying zone and a friction zone. An expanding stream is built up and forms a flow front in the expanding zone due to the small width of the slit, air being prevented from entering so that the reaction mixture remains completely free from bubbles. The blocking zone may be characterized by spiral grooves running in the direction of rotation of the baffle plate or blocking beams having a reduced cross-section. The conveying zone may have spiral grooves running against the direction of rotation of the baffle plate. The friction zone lies in the outer region of the after-mixing chamber, i.e. in the region of the larger diameter, and is produced by the reduced gap and/or spiky surface and the high circumferential speed of the baffle plate.

At least one of the baffle plates is preferably provided with exchangeable edging members on its surface facing the slit. The surface of the baffle plate can be adapted to any requirements without great difficulty by means of these edging members which can be screwed on to the base plate. These edging members can, for example, be screwed on or clamped firmly. Edging members of a wide variety of materials corresponding to the stress can, therefore, be applied depending on the type of reaction mixture. Thus, edging members made of alloyed steel with a nitrided surface are used, for example, with reaction mixtures containing abrasive fillers. Aluminum with a polytetrafluoroethylene coating is suitable for non-abrasive but highly adhesive reaction mixtures. Edging members composed of polytetrafluoroethylene, polypropylene, polyurethane resins and expoxide resins which are more economical are used, for example, in the case of low mechanical stress and low centrifugal acceleration. The angle at which the after-mixing chamber expands continuously or discontinuously, for example by means of cascade-type steps, between the baffle plates lies between 0° and 90° to the rotational axis of the baffle plate provided with a rotary drive. A cascade-type design, optionally combined with a modification of the thickness of the mixing slit by continuous or step-wise alteration of the distance between the baffle plates has proven particularly advantageous. The effective surface of the baffle plate limiting the mixer slit can be increased considerably by a design of this type or also possibly by insetting elevations in indentations on the opposite plate with a baffle plate of the same diameter.

In one embodiment, the baffle plate which rotates is provided with a mold. In this case, the mold rotates with the baffle plate.

It can, however, also be advantageous to provide a separate drive for the mold so that the mold can then be filled with reaction mixture depending on the respective requirements both in the rest position and rotating at a different speed from, and preferably a lower speed than, the baffle plate.

If both baffle plates are axially mobable, it is possible to displace them commonly by maintaining a constant thickness of the slit in the mixing chamber. In this way, it is possible to distribute the reaction mixture uniformly inside the mold cavity, which is open toward the rotational axis, of a rotating mold or to distribute the mass in a defined manner in the axial direction during mold filling.

In normal cases, the baffle plates are arranged to rotate symmetrically. In special cases, however, slight parallel shifting of the axis of symmetry or a modification of the angle between the axis of symmetry of the baffle plates to 180° may be advantageous, in order to produce a rotational speed of the reaction mixture which differs over the circumference of the after-mixing chamber, for example, for filling mold cavities of different volumes. The rotation axis fall together with the axis of symmetry.

The apparatus can be used both in the horizontal and in the vertical position as well as in all intermediate positions.

At the end of the mixing process, the baffle plates can be brought sufficiently close together in the axial direction for the reaction mixture still located between them to be forced and accelerated centrifugally in such a way that the after-mixing slit automatically cleans itself. In some cases, the cleaning effect can be further increased by raising the speed of the rotating baffle plate during the cleaning period. Subsequently, or as the mold is opened for removal from the mold, the two baffle plates can be automatically driven sufficiently far apart in the axial direction and, optionally, pivoted for them to be checked optically or sprayed with release agent.

According to another particular embodiment, the premixing chamber has at least two outlet channels which merge into the after-mixing chamber outside the center.

A covering application of the premixture is thus produced on the surface of the baffle plate owing to the rotating baffle plate, the layer becoming thinner, the faster the baffle plate rotates. This measure allows particularly good after-mixing to be achieved with relatively slight turbulence.

Several embodiments of the apparatus according to the invention are illustrated purely schematically in sectional drawings and are described in more detail below.

Figure 1:
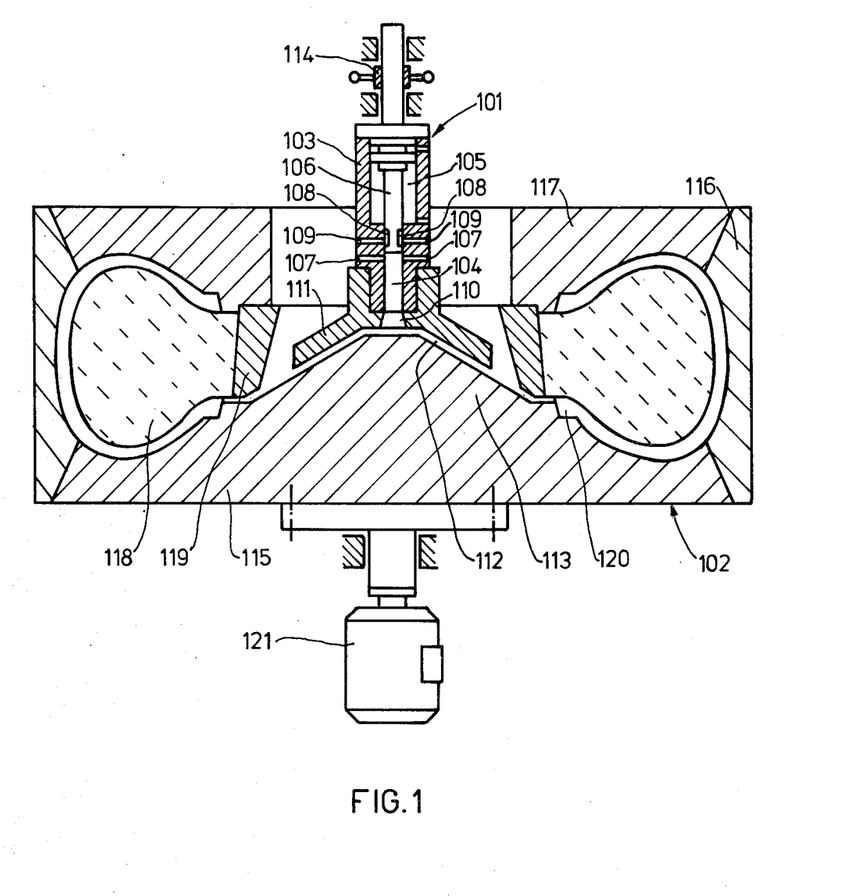
FIG. 1 shows an apparatus whose baffle plate (which can be set into rotation) is rigidly connected to a mold.

In FIG. 1, the mixing device 101 is combined with a mold 102. The mixing device 101 comprises a housing 103 in which is arranged a premixing chamber 104. A movable ejection and control piston 106 is also guided in the housing 103 by a hydraulic device 105. The components pass from storage containers which are not shown via metering pumps and feed pipes to the inlet channels 107 and, in the mixing position, then into the premixing chamber 104. If the ejection and control piston 106 is in the ejection position, the components flow out of the inlet channels 107 via the recirculation grooves 108 and the recirculation channels 109, via return pipes which are not shown back into the storage containers. The outlet opening 110 of the premixing chamber 104 is surrounded by a baffle plate 111 and simultaneously forms the inlet opening for an after-mixing chamber 112 which is designed as a gap between the baffle plate 111 and an additional baffle plate 113. The housing 103 can be moved axially together with the baffle plate 111 by means of a hand wheel 114 in order to adjust the slit forming the after-mixing chamber 112. The baffle plate 113 is produced from one piece with the mold portion 115. Together with the mold portions 116, 117 and the core 118 with core ring 119, this piece forms the mold cavity 120 for a vehicle tire. A rotary drive 121 is provided on the mold portion 115 coaxially with the central axis of the premixing chamber 104.

Figure 2:
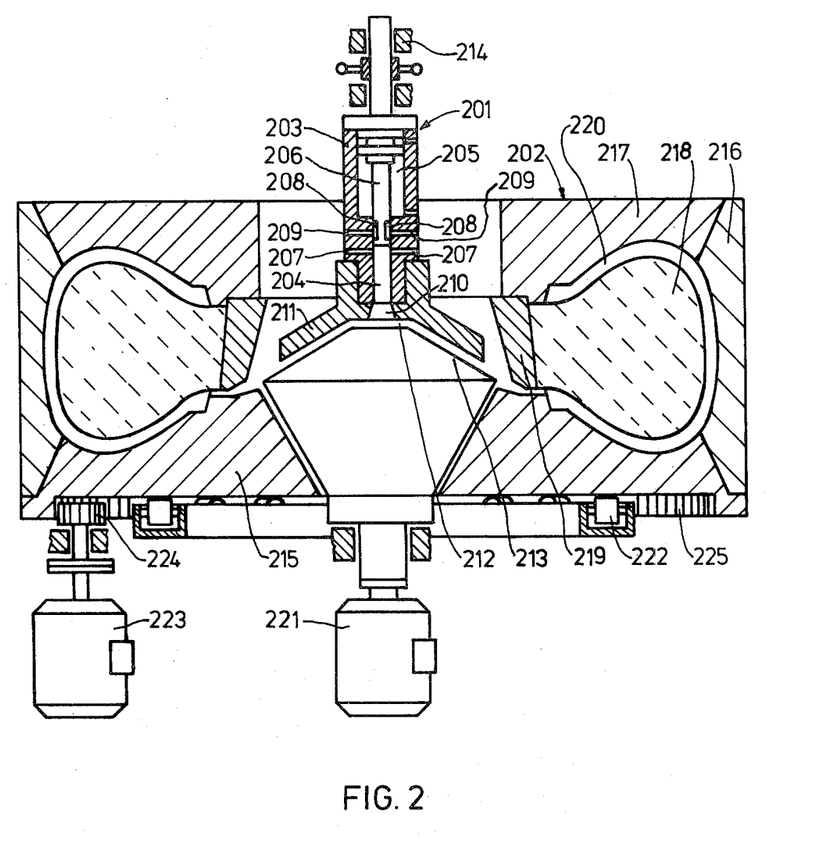
FIG. 2 shows an apparatus which has separate rotary drives for the mold and one of the baffle plates.

In FIG. 2, the mixing device 201 is combined with a mold 202. The mixing device 201 comprises a housing 203 in which a premixing chamber 204 is arranged. An ejection and control piston 206 which can be moved by a hydraulic device 205 is guided in the housing 203. The components pass through storage containers which are not shown via metering pumps and feed pipes to the inlet channels 207 and, in the operating position, then into the mixing chamber 204. If the ejection and control piston 206 is in the ejection position, the components flow out of the inlet channels 207 via recirculation grooves 208 and recirculation channels 209 via return pipes which are not shown back into the storage containers. The outlet opening 210 of the premixing chamber 204 is surrounded by a baffle plate 211 and simultaneously forms the inlet opening lying in the center for an after-mixing chamber 212 which is designed as a gap between the baffle plate 211 and another baffle plate 213. The housing 203 together with the baffle plate 211 can be moved axially by means of a hand wheel 214 in order to adjust the slit forming the after-mixing chamber 212. The baffle plate 213 is provided with a rotary drive 221. The mold 202 is made up of the mold portions 215, 216, 217 and the core 218 with core ring 219. These portions form a mold cavity 220 for the production of a vehicle tire. The mold portion 215 is mounted on a roller ring 222 and has its own rotary drive 223, the pinion 224 of which engages in a toothed crown 225 of the mold portion 215.

Figure 3:
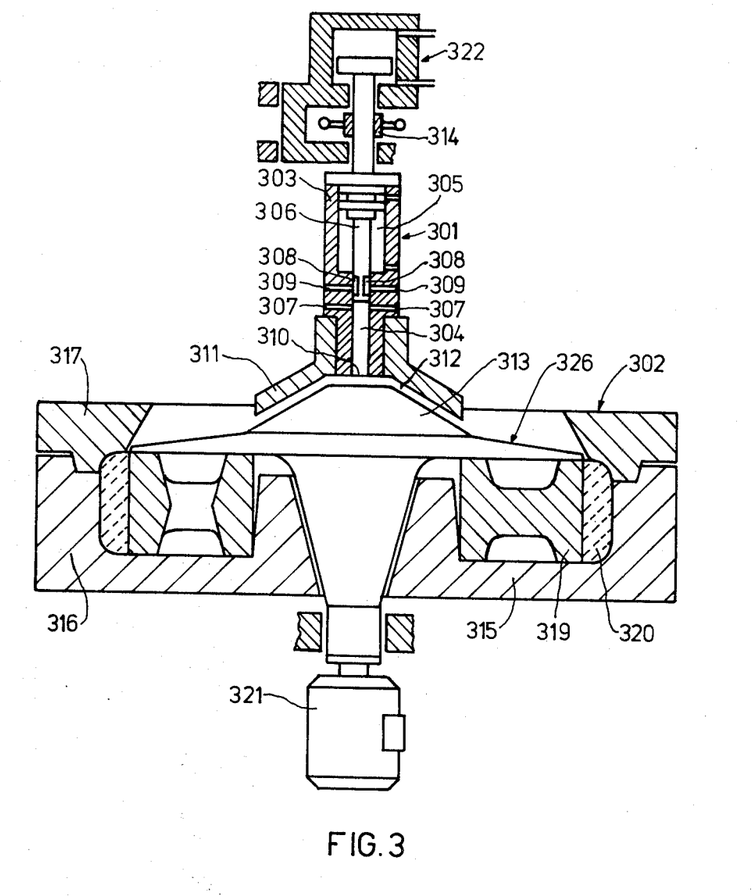
FIG. 3 shows an apparatus with the mold at rest.

In FIG. 3, the mixing device 301 is also combined with a mold 302. The mixing device 301 comprises a housing 303 in which a mixing chamber 304 is arranged. An ejection and control piston 306 which can also be moved by a hydraulic device 305 is also guided in the housing 303. The components pass from storage containers which are not shown via metering pumps and feed pipes to the inlet channels 307 and then into the mixing chamber 304 in the operating position. If the ejection and control piston 306 is in the ejection position, the components flow out of the inlet channels 307 via recirculation grooves 308 and recirculation channels 309 via return pipes which are not illustrated back into the storage containers. The outlet opening 310 of the premixing chamber 304 is surrounded by a baffle plate 311 and simultaneously forms the inlet opening lying in the center for an after-mixing chamber 312 which is formed as a slit between the baffle plate 311 and another baffle plate 313. The housing 303 is joined together with baffle plate 311 to an axial adjusting device 322 which can be activated hydraulically or pneumatically, with which the pressure can be adjusted in the mixing slit forming the after-mixing chamber 312 during the mixing process. The baffle plate 313 is connected to a rotary drive 321. The mold 302 is made up of the mold portions 315, 316, 317 and the core ring 319.

These portions form a mold cavity 320 for the production of the running tread of a tire. The mold 302 is arranged rigidly and does not, therefore, rotate. The reaction mixture passes from the after-mixing chamber 312 via a free sliding face 326 which is rigidly connected to the baffle plate 313 into the mold cavity 320.

The housing 303 can be moved axially together with the baffle plate 311 by means of a hand wheel 314 in order to adjust the slit forming the after-mixing chamber 312.

Figure 4:
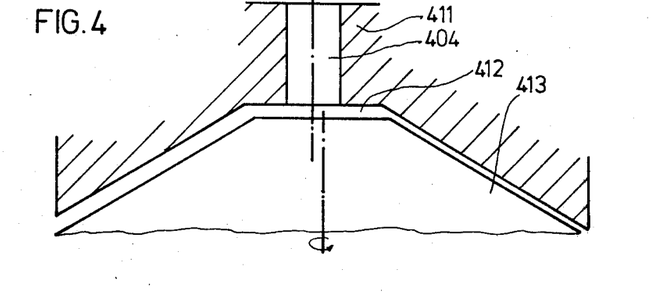
FIGS. 4 to 15 show various embodiments of the baffle plates and their orientation relative to each other.

In FIG. 4, the axes of the rigid baffle plate 411 and of the drivable baffle plate 413 are offset parallel to each other. The premixing chamber 404 lies in the center of the baffle plate 411. The after-mixing chamber 412 has a differing slit width, viewed over the circumference.

Figure 5:
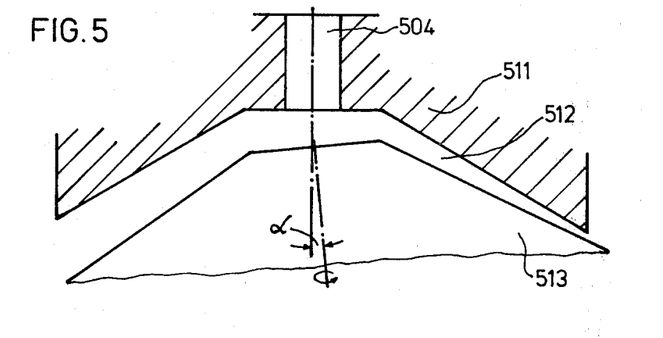

In FIG. 5, the axes of the rigid baffle plate 511 and of the rotatable baffle plate 513 are at an angle α of 5° to each other. The premixing chamber 504 lies in the center of the baffle plate 511. The after-mixing chamber 512 has a differing slit width when viewed over the contour and also in a radial direction.

Figure 6:
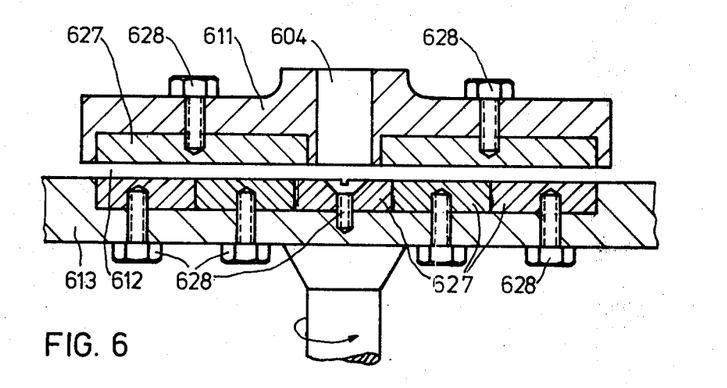

In FIG. 6, the after-mixing chamber 612 is designed to extend perpendicularly to the axes of the baffle plates 611 (in which the premixing chamber 604 is arranged) and 613. The baffle plate 611 has an annular edging member 627 composed of hard metal which is detachably fixed by screws 628. The baffle plate 613 is also covered with wear-resistant plates 627 made of hard metal which are detachably fixed by screws 628 and are disc-like or consist of concentric rings, so that the after-mixing chamber 612 is limited by wear-resistant surfaces.

Figure 7:
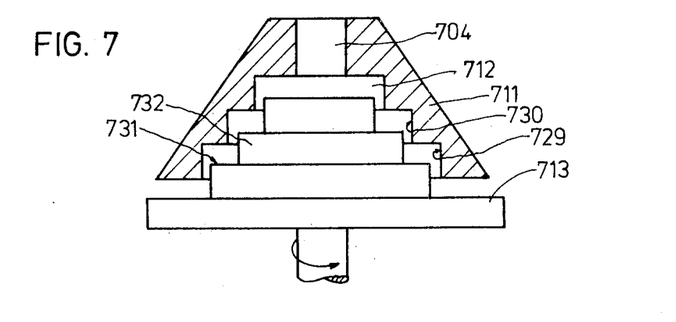

In FIG. 7, the surface 729 of the rigid baffle plate 711 has cascade-like negative contours 730.

The premixing chamber is designated by 704. The rotatable baffle plate 713 is also provided with cascade-like but positive contours 732 on its surface 731 so that the after-mixing chamber 712 runs stepwise when viewed in cross-section.

Figure 8:
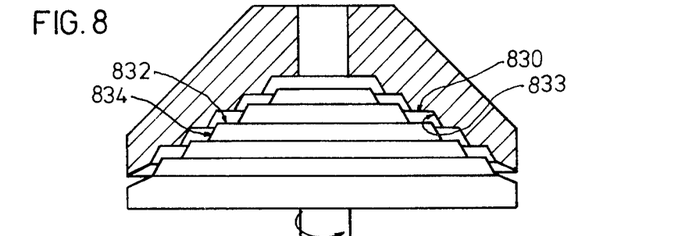

In FIG. 8, the flanks 833, 834 of the contours 830, 832 are bevelled.

Figure 9:
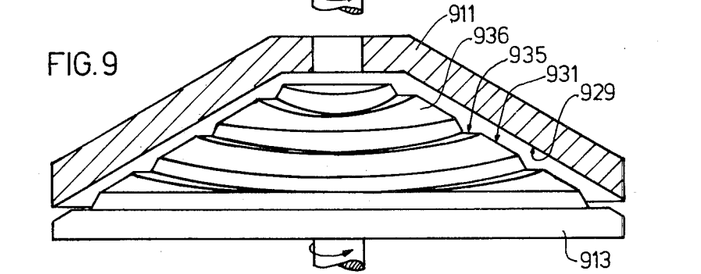

In FIG. 9, the rigid baffle plate 911 is provided with a smooth surface 929 while the rotatable baffle plate 913 has annular recesses 935 on its surface 931 which are of different levels when viewed over the contour and between which are formed blocking beams 936.

Figure 10:
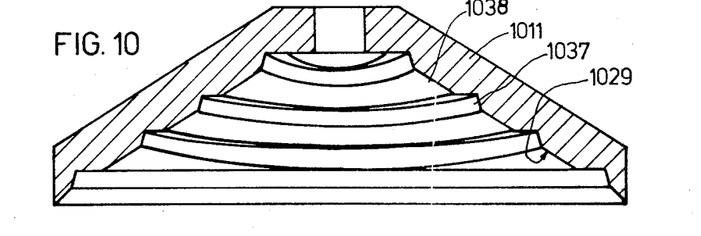

FIG. 10 only shows the rigid baffle plate 1011. Its surface 1029 forms the counterpart to the surface 931 of the rotatable baffle plate 913 according to FIG. 9. Recesses 1037 which alternate with blocking beams 1038 are also provided here.

Figure 11:
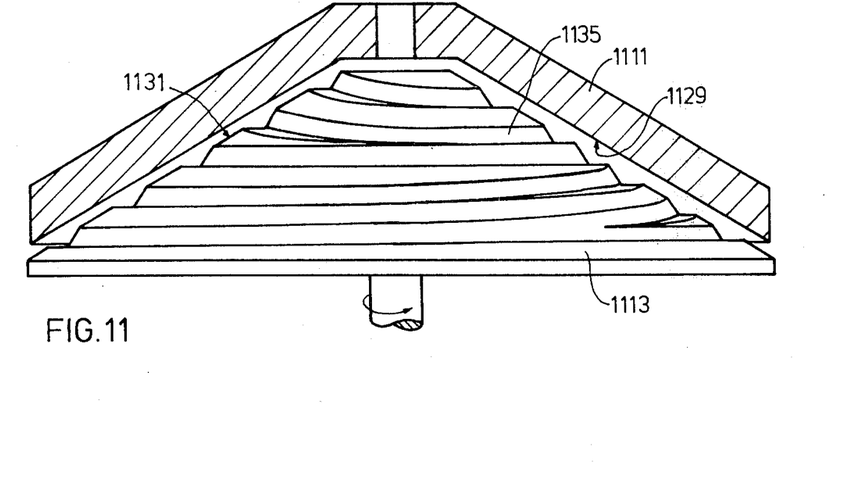

In FIG. 11, the rigid baffle plate 1111 is provided with a smooth surface 1129 while the surface 1131 of the rotatable baffle plate 1113 exhibits a spiral-type recess 1135.

Figure 12:
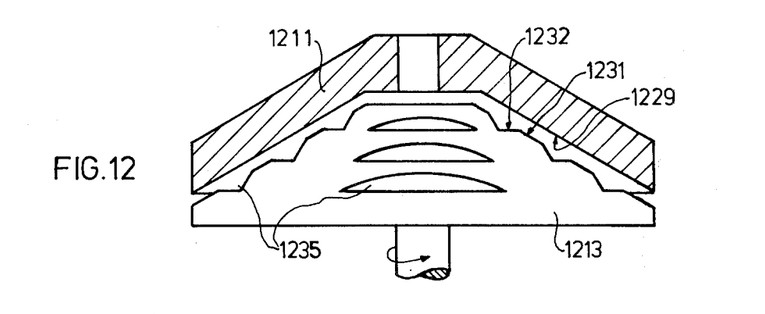

In FIG. 12, the surface 1229 of the rigid baffle plate 1211 is also designed smooth. The surface 1231 of the rotatable baffle plate 1213 has several recesses 1235 offset by 90° at a different level from contour 1232.

Figure 13:
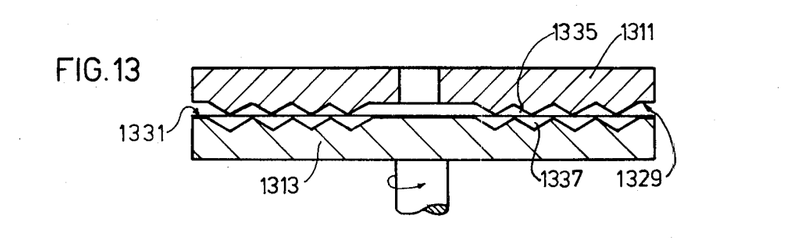

In FIG. 13, both the surface 1329 of the rigid baffle plate 1311 and the surface 1331 of the rotatable baffle plate 1313 have concentric groove-like recesses 1335 and 1337.

Figure 14:
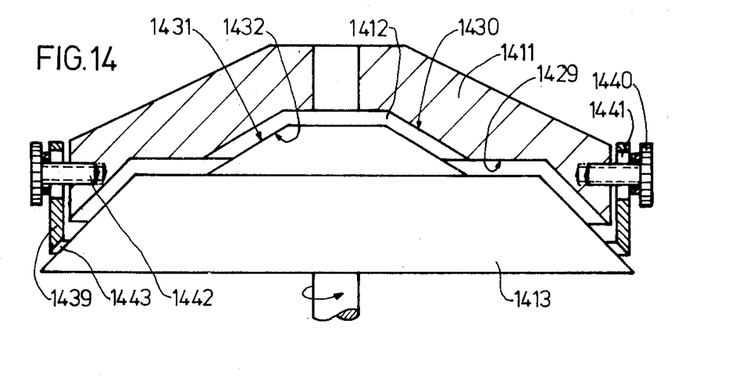

In FIG. 14, the surface 1429 of the rigid baffle plate 1411 has a conical staggered contour 1430. The rotatable baffle plate 1413 displays a corresponding contour 1432 on its surface 1431. A ring 1439 which is adjustable in the axial direction can be clamped firmly on the circumference of the rigid baffle plate 1411 by means of knurled screws 1440 which are driven through slots 1441 in the ring 1439 and engage in screw-threaded holes 1442 in the baffle plate 1411. The width of the outlet slit 1443 of the after-mixing chamber 1412 can be adjusted with respect to the surface 1431 of the baffle plate 1413 using this ring 1439.

Figure 15:
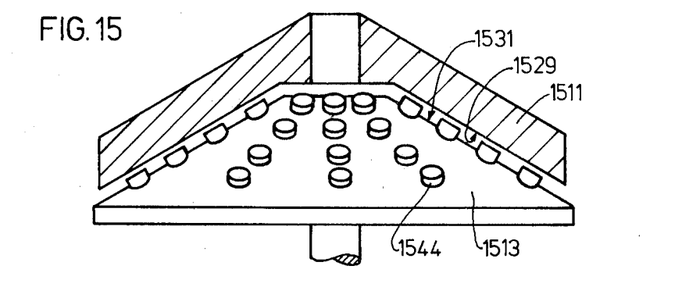

In FIG. 15, the surface 1529 of the rigid baffle plate 1511 is designed smoothly. The surface 1531 of the drivable baffle plate 1513 is, however, provided with heads 1544.

Figure 16:
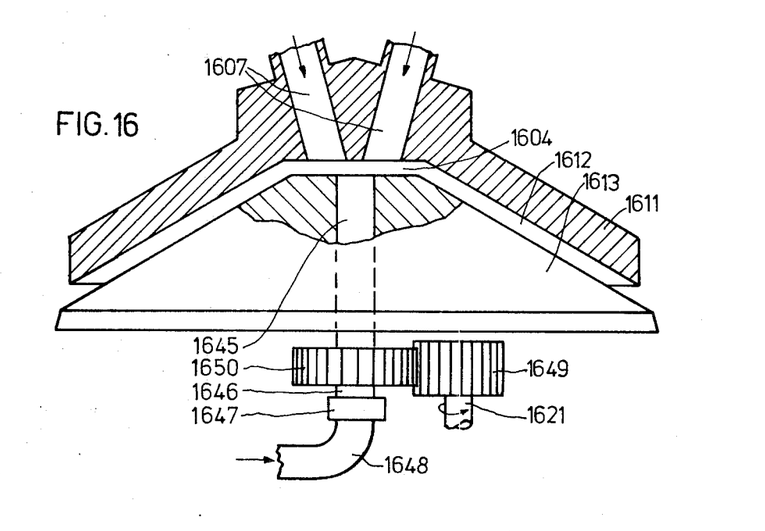
FIGS. 16 and 17 show variations of the component feed.

In FIG. 16, the premixing chamber 1604 is located exactly in the central axis in the center between the two baffle plates 1611, 1613 and passes directly into the after-mixing chamber 1612. The components are supplied via the channels 1607 in this case. An additional channel 1645 for filler lies on the central axis of the rotatable baffle plate 1613. The inlet nozzle 1646 of the channel 1645 is mounted in a sliding seal 1647 into which a feed pipe 1648 merges. The rotary drive 1621 is carried out via a pinion 1649 which engages in a toothed wheel 1650 fixed on the inlet nozzle 1646.

Figure 17:
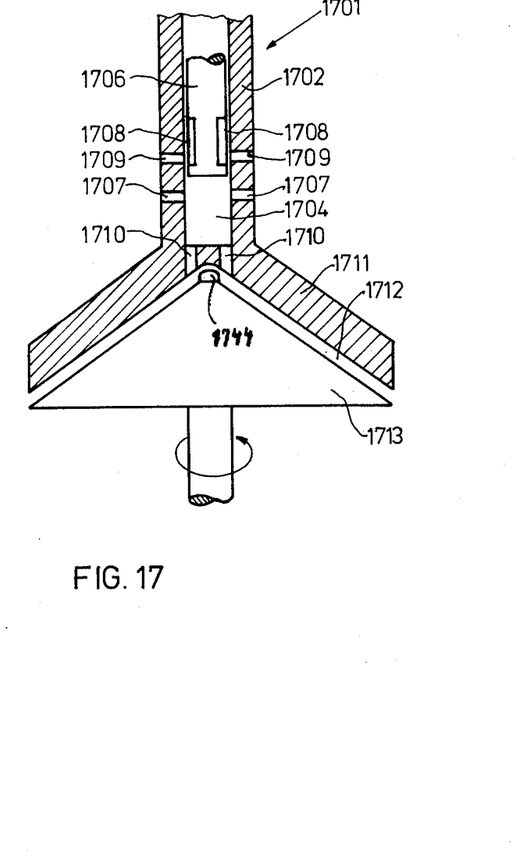

In FIG. 17, the mixing device 1701 has a housing 1702 in which is arranged a premixing chamber 1704. A movable ejection and control piston 1706 is guided into it. In the mixing position of the piston 1706, the components pass via the inlet channels 1707 into the mixing chamber 1704. In the ejection position of the piston 1706, the components flow out of the inlet channels 1707 back again via the recirculation grooves 1708 and channels 1709. The premixing chamber 1704 has two outlet openings which are designed as outlet channels 1710 which merge into the after-mixing chamber 1712 outside the common central axis of the baffle plates 1711, 1713. The baffle plate 1713 is provided with a head 1744 in the center which initially separates the two streams of the premixture flowing from the outlet channels 1710 from each other.

It goes without saying that it has only been possible to give a brief survey of the plurality of possible embodiments and that the skilled man would have no difficulty in selecting solutions lying within the scope of the idea of the invention which are modified for special problems on the basis of this disclosure.

What is claimed is:

1. An apparatus for producing a reaction mixture for forming solid or cellular materials from flowable reactants, and optionally, fillers, comprising:
   (a) storage containers for the reactants,
   (b) a mixhead housing,
   (c) feed pipes leading from each of said storage containers via metering pumps to the inlet openings of a mixing chamber located in said mixhead housing, said mixing chamber having at least one outlet opening,
   (d) an after mixing chamber,
   (e) said outlet opening leading to the inlet opening of said aftermixing chamber,
   (f) said aftermixing chamber being in the form of a slit, said slit formed by a first baffle plate attached to said mixhead housing and a second baffle plate spaced from said first baffle plate,
   (g) a mold housing, said slit opening into a mold cavity of said mold housing,
   (h) at least one of said baffle plates being provided with a rotary drive,
   (i) said baffle plates being located within said mold housing.

2. The apparatus of claim 1, wherein said mixing chamber is arranged in the center region of said first baffle plate.

3. The apparatus of claim 1, wherein at least one of said baffle plates is axially movable.

4. The apparatus of claim 1, wherein one of said baffle plates is provided with contours on its surface which point toward corresponding slits on the opposite baffle plate surface.

5. The apparatus of claim 1, wherein at least one of said baffle plates is provided on its surface with exchangeable edging members.

6. The apparatus of claim 1, wherein said baffle plate provided with a rotary drive is connected to said mold housing.

7. The apparatus of claim 1, wherein said mixing chamber has at least two outlet channels which merge into said after-mixing chamber.

* * * * *

UNITED STATES PATENT AND TRADEMARK OFFICE
CERTIFICATE OF CORRECTION

PATENT NO. : 4,313,909

DATED : February 2, 1982

INVENTOR(S) : Heinrich Boden; Heinz Müller, Bernd Sowade

It is certified that error appears in the above—identified patent and that said Letters Patent is hereby corrected as shown below:

Title - last word - please correct to read: --FIBERS--.

Column 4, lines 6 and 7, please correct the spelling of --epoxide--.

Signed and Sealed this

Thirteenth Day of March 1984

[SEAL]

Attest:

GERALD J. MOSSINGHOFF

Attesting Officer

Commissioner of Patents and Trademarks